United States Patent [19]

Jones

[11] Patent Number: 5,110,451
[45] Date of Patent: May 5, 1992

[54] COAL EXTRACTION PROCESS

[75] Inventor: Michael A. Jones, Gloucester, England

[73] Assignee: Coal Industry (Patents) Limited, United Kingdom

[21] Appl. No.: 641,791

[22] Filed: Jan. 16, 1991

Related U.S. Application Data

[63] Continuation of Ser. No. 344,499, Apr. 27, 1989, abandoned, which is a continuation of Ser. No. 75,730, Jul. 20, 1987, abandoned.

[30] Foreign Application Priority Data

Aug. 22, 1986 [JP] Japan .................................. 8620460

[51] Int. Cl.$^5$ .................................................. C10G 1/06
[52] U.S. Cl. .................................. 208/421; 208/413; 208/422
[58] Field of Search ............... 208/413, 422, 419, 421, 208/423

[56] References Cited

U.S. PATENT DOCUMENTS

| | | | |
|---|---|---|---|
| 3,532,617 | 10/1970 | Hodgson | 208/421 |
| 3,932,266 | 1/1976 | Sze et al. | 208/423 |
| 4,083,769 | 4/1978 | Hildebrand et al. | 208/422 X |
| 4,157,291 | 6/1979 | Paraskos et al. | 208/422 X |
| 4,179,352 | 12/1979 | Effron | 208/413 |
| 4,294,685 | 10/1981 | Kim et al. | 208/421 |
| 4,295,954 | 10/1981 | Mitchell | 208/423 |
| 4,338,183 | 7/1982 | Gatsis | 208/422 X |
| 4,344,838 | 8/1982 | Mitchell | 208/416 |
| 4,358,359 | 11/1982 | Rosenthal et al. | 208/422 X |
| 4,391,699 | 7/1983 | Rosenthal | 208/422 X |
| 4,401,550 | 8/1983 | Urban | 208/422 X |
| 4,431,510 | 2/1984 | Gatsis | 208/422 X |
| 4,541,913 | 9/1985 | Urquhart et al. | 208/952 |

FOREIGN PATENT DOCUMENTS

| | | |
|---|---|---|
| 0024109 | 2/1981 | European Pat. Off. |
| 0181082 | 5/1986 | European Pat. Off. |
| 0191960 | 8/1986 | European Pat. Off. |
| 1228089 | 10/1986 | Japan ........................ 208/422 |

OTHER PUBLICATIONS

European Search Report EP 85 30 1001.

*Primary Examiner*—Anthony McFarlane
*Attorney, Agent, or Firm*—Stevens, Davis, Miller & Mosher

[57] ABSTRACT

A two stage coal extracting process has a first liquid hydrogen donor solvent oil extraction stage and a second stage comprising catalytic hydrocracking of the extract. Desired levels of hydrocracking and hydrogenation of the extract, with an acceptable level of napthene formation, are achieved by using on the catalyst a mixture of a promoted W or Mo catalyst with an unpromoted W or Mo catalyst.

6 Claims, 1 Drawing Sheet

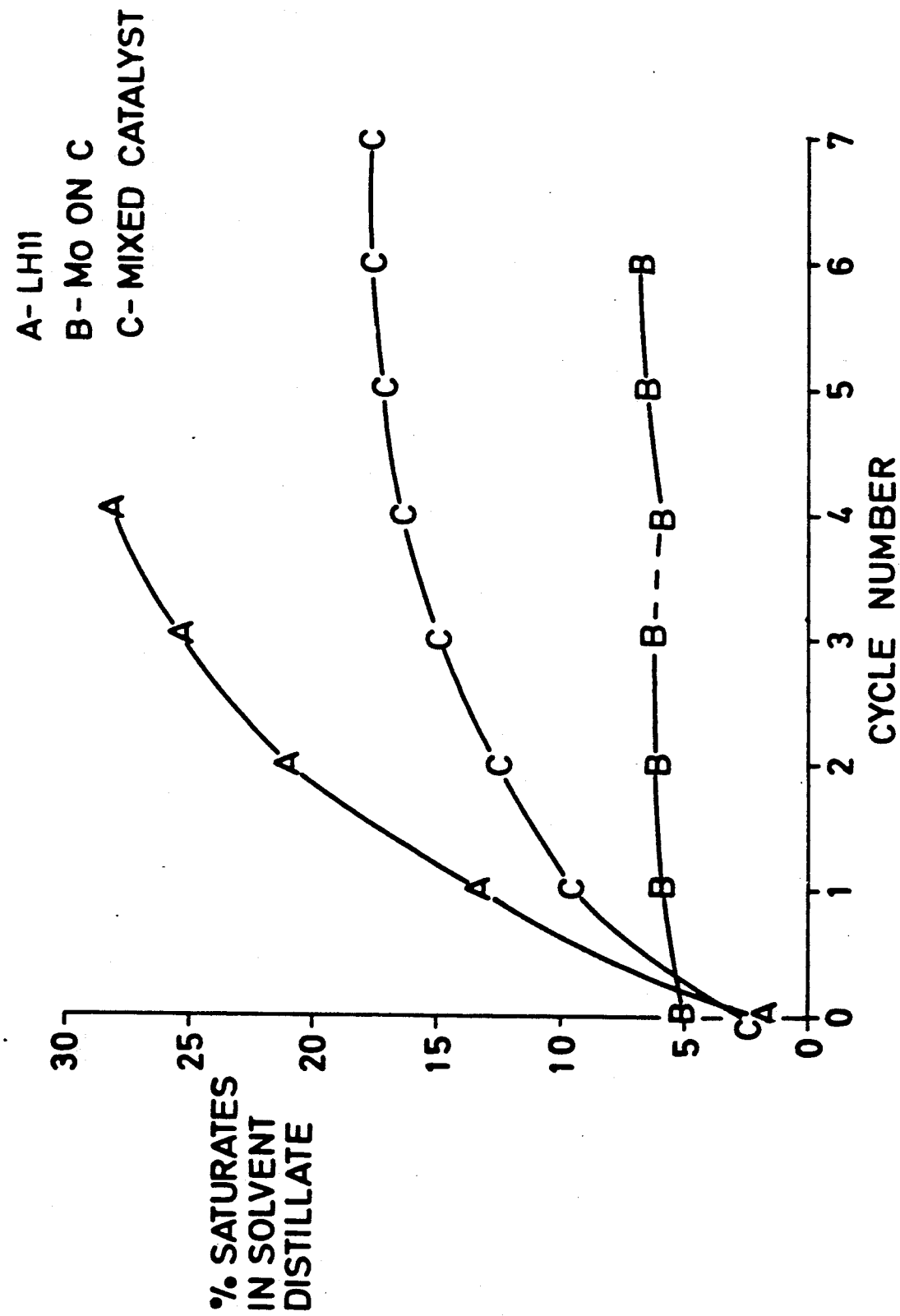

COAL EXTRACTION PROCESS

CROSS-REFERENCE TO RELATED APPLICATIONS

This application is a continuation of U.S. patent application Ser. No. 344,499 filed Apr. 27, 1989, now abandoned, which in turn was a continuation of U.S. patent application Ser. No. 075,730, filed Jul. 20, 1987, now abandoned.

BACKGROUND OF THE INVENTION

1. Field of the Invention

This invention concerns a coal extraction process. More especially it concerns a liquid solvent extraction process incorporating a recycle of solvent after a hydrogenation stage.

2. Description of the Related Art

It is known to extract coal using a liquid hydrogen donor solvent oil, and to hydrocrack and/or hydrogenate the coal solution over a catalyst. Such a process may be termed a two-stage direct liquefaction, as opposed to a single stage liquefaction in which hydrogen is directly supplied to a coal-solvent slurry. The two-stage process generally shows increased yields of gasoline, aviation and diesel fuel fractions per unit of hydrogen consumed, compared to the single stage process. Part of the advantage held by the two-stage process derives from the use in the extraction stage of a recycle solvent rich in hydrogen donors, which stabilize by hydrogen transfer the free radicals formed by decomposition of the coal, and hence suppress recombination reactions and solvent adduction, leading to less hydrocarbon gas formation during hydrocracking.

SUMMARY OF THE INVENTION

Our research work has shown that there is a tendency for the hydrocracking stage to result in over-hydrogenation of the solvent fraction, producing an undesired excess of naphthenes rather than hydrogen-donor hydroaromatics. This has several effects including a high consumption of expensive hydrogen and, importantly, the production of a recycle solvent containing naphthenes in such quantities that there is a tendency for high molecular weight or polar compounds to separate out of solution if the solution temperature falls. This may cause blockages in equipment.

We have discussed these problems and disclosed methods of reducing the naphthene content of recycle solvents in our copending published applications Ser. Nos. 2,156,841A and 86/13422, (U.S. application Ser. No. 050,672 filed May 18, 1987) the teachings of which are incorporated herein by reference.

The recommended catalysts for hydrocracking coal solutions are molybdenum sulphide or tungsten sulphide, promoted with a group VIII metal such as nickel or cobalt, on a support, which may be an alumina, alumina-silicate, silica, active carbon, magnesia, chromia, titania, carbon etc., and many suitable catalysts are commercially available as sulphur-resistant hydrotreatment or hydrocracking catalysts for petroleum refining.

BRIEF DESCRIPTION OF THE DRAWINGS

The sole Figure is a graphical representation of the plot of saturation content of solvent distillate for Runs A, B and C as further described hereinbelow.

DESCRIPTION OF THE PREFERRED EMBODIMENTS

We have now found a novel method of carrying out a two-stage coal liquefaction process, comprising extracting a coal with a liquid hydrogen donor solvent at elevated temperature and pressure, catalytically hydrocracking at least a portion of the extract and at least a portion of the solvent and recycling as solvent a fraction of the hydrocracked product, characterised in that the hydrocracking catalyst is a mixture of a promoted tungsten or molybdenum sulphide catalyst and an unpromoted tungsten or molybdenum sulphide catalyst. The invention further provides a mixed catalyst for use in the method.

We have found that the present invention enables the extract and solvent to be subjected to the desired extents of both hydrocracking and hydrogenation thereby controlling the formation of naphthenes to acceptable levels, while achieving the desired product yields. It can readily be seen that the invention offers a less expensive method of controlling naphthene contents than methods involving a post-treatment step, which may reduce product yields. Preferably, the catalyst mixture is based on molybdenum, although the invention includes the use of tungsten or one component being molybdenum sulphide and the other tungsten sulphide. Preferred promoters for the promoted catalyst component are cobalt or nickel, especially nickel. The catalysts are preferably supported; suitable supports are mentioned above, and alumina and carbon are especially preferred. The tungsten or molybdenum may be present at loadings of from 1 to 30% by weight, calculated as the oxide, preferably 5 to 25% by weight, and the promoter is suitably present at loadings of 0.1 to 5%, preferably 0.5 to 4%, calculated as the oxide.

The catalyst mixture may be used in conventional manner and at conventional temperatures, pressures and space velocities. Suitable temperatures are 350° to 480° C.; suitable hydrogen partial pressures are 50 to 250 bar. Suitable space velocities are 0.1 to 3.0 h$^{-1}$. The hydrocracking stage may be carried out in a conventional reactor using a fixed catalyst bed or a moving catalyst bed, preferably such as an ebullating bed. The invention has particular advantages when used with a moving bed i.e. one in which partial catalyst replacement may be practised, in that the proportion of promoted to unpromoted catalyst may be varied during operation of the process in order to adjust the product mix. This may be a more effective adjustment method than varying the other process variables.

Suitably, the promoted catalyst is present in an amount of from 2 to 75% by volume of the total, preferably 5 to 20 vol. % of the total (100 vol. %) catalyst. The volume percent of the unpromoted catalyst can be determined by subtracting the volume percent of the promoted catalyst from the total (100 vol. %) catalyst.

The unpromoted catalyst, unlike the promoted catalyst, is not readily available commercially. However, it may be prepared using known catalyst preparation methods, i.e. by impregnation of a support. It has been found that the conventional step of calcining may be disadvantageous with regard to overall conversion, compared to air drying at up to 105° C., or vacuum drying. The catalysts may be pre-sulphided or sulphided in situ, e.g. in a first run or by virtue of the sulphur content of the extract/solvent feedstock.

The first, liquefaction, stage of the process is not critical to the present invention and may be carried out in manner known per se.

The invention may be further understood with reference to the accompanying Table 1, which gives analysis of feedstock and product for a single cycle hydrocracker test. Coal solutions were prepared by extraction of coal from Point of Ayr colliery, Wales, with a hydrogenated anthracene oil boiling in the range 250 to 450° C., at a 2:1 solvent to coal ratio, temperature of 410° C. and pressure of 15 bar g. In order to improve the accuracy of measurement of the change of concentration of components during hydrocracking, the coal solution was concentrated to about 50% extract by distillation. The concentrated solution was hydrocracked at 450° C. and 210 bar hydrogen pressure over a variety of pre-sulphided catalysts in a fixed bed reactor. Analyses of the feedstock, total liquid product and the 300°-450° C. fraction of feed and product (representing the solvent after concentrating the feed solution) are given in the attached Table 1.

In the Table, particular note should be taken of the change in the saturates concentration of the solvent, and of the conversion of the extract. Other measures of the extent of hydrogenation are the changes in total hydrogen and aromatic hydrogen contents.

The first five catalysts listed in the table are commercially available but have been given internal code numbers. LH27 is cobalt and molybdenum on alumina, and the other four are nickel and molybdenum on alumina. These five catalysts gave similar conversions, in the range 63-70%, similar saturates formation of 9.0-10.9% and decreases similar increases in hydrogen and aromatic hydrogen contents of 2.0-2.2% and 1.3-1.5%, respectively.

To test the reliability of our laboratory techniques of catalyst preparation, we simulated LH11 by depositing 3% NiO and 15% $MoO_3$ on alumina, and calcining (code LH24). This catalyst gave results generally similar to those from the commercial catalysts.

In catalyst preparation LH22, 28 and 23 (15% $MoO_3$ on alumina, air dried at 105° C.; 15% $MoO_3$ on alumina, vacuum dried; 15% $MoO_3$ on alumina, calcined; respectively), the nickel promoter was omitted, and a substantial reduction in the formation of saturates, the 1.6-2.9%, was observed, together with smaller reductions in the increased changes in hydrogen and the decreased changes in aromatic hydrogen contents. The conversion was also reduced; this effect was more noticeable when the catalyst was calcined (LH23) than when it was merely dried before use (LH22 and 28). Using carbon as the support instead of alumina, (LH19:15% $MoO_3$ on active carbon, air dried at 105° C.) gave similar results, except that less light distillate (C5-300° C.) and more solvent (300°-450° C.) were formed, and nitrogen and sulphur were less effectively removed.

In an attempt to improve the conversion achieved with the molybdenum catalysts without significant increase in the saturates formation, catalysts of intermediate composition between those with no promoter and the commercial catalysts were prepared. In LH25, the nickel promoter was introduced at one third of the loading (1%) of nickel int LH11, but this produced results similar to those obtained with the full 3% nickel in LH24. In catalyst LH26, molybdenum catalyst LH22 was mixed in equal proportions with catalyst LH11, but the results were closer to those obtained with LH11 than those obtained with LH22.

It was considered that the effects of mixing catalysts were likely to be non-linear, and a further catalyst was prepared by mixing 90 parts of catalyst LH22 with 10 parts of LH11. This mixed catalyst was tested in a laboratory coal extraction pilot plant permitting recycle of a solvent fraction from the hydrocracker, as described below.

Point of Ayr coal was extracted with a 250° C.+recycle solvent, and the coal solution was hydrocracked at 425° C. and 210 bar hydrogen pressure. The product from the hydrocracker was cut at 250° C. to separate product and solvent, and excess unconverted material boiling above 450° C. was removed. The quantity of this material in the recycle solvent was controlled at about 30%. Product yields and the composition of the 250-450° C. solvent distillate were measured in each cycle.

Three runs were carried out to compare the performance of different catalysts. In run A, the catalyst used was LH11 and the run comprised four cycles. In run B, the catalyst was 10% molybdenum on carbon. For the first three cycles the space velocity was the same as in run A, and in the next three cycles the space velocity was halved to increase conversion. In run C, the catalyst was the 90/10 mixed catalyst referred to above; the run comprised seven cycles at the half space velocity.

The saturates content of the solvent distillate in each cycle of each run are plotted in the accompanying Figure. In run A, the saturates content increased to 28% in four cycles; in run B the saturates content barely increased above 6% even at the lower space velocity. In run C, the content stabilizes at an acceptable level of 18%. The beneficial effect of the unpromoted catalyst in runs B and C is clearly shown in the Figure.

The conversion results are shown in the following Table 2.

TABLE 2

| Product Yield | Distillate % dmmf coal | | 450° C. + material % dmmf coal | |
|---|---|---|---|---|
| Relative LHSV | 1 | 0.5 | 1 | 0.5 |
| Catalyst | | | | |
| LH11 | 44 | — | 25 | — |
| Mo on C | 31 | 39 | 39 | 29 |
| Mixed Catalyst | — | 48 | — | 15 |

The molybdenum on carbon catalyst was less reactive than LH11 and gave lower conversions even at the half space velocity. The mixed catalyst, however, exhibited an activity approaching that of LH11, and gave a good yield of distillate with decreased yield of residual material at the half space velocity. In all runs, the solvent retained a sufficiently high content of hydrogen donors, as shown by good extraction of the coal. We concluded from the results given that the mixed catalyst gave the required overall performance.

TABLE 1

| | Catalyst Code No. | | | | | |
|---|---|---|---|---|---|---|
| | LH27 | LH9 | LH10 | LH12 | LH11 | LH24 |
| Feed analysis, % | | | | | | |
| C5-250° C. | 0 | 0.2 | 0.2 | 0.2 | 0.2 | 0 |
| 250-300° C. | 1.5 | 0.2 | 0.2 | 0.2 | 0.2 | 1.5 |
| 300-350° C. | 19.3 | 12.4 | 12.4 | 12.4 | 12.4 | 17.4 |
| 350-400° C. | 21.1 | 25.5 | 25.5 | 25.5 | 25.5 | 20.4 |
| 400-450° C. | 7.4 | 12.5 | 12.5 | 12.5 | 12.5 | 6.3 |
| 450° C+ | 50.7 | 49.2 | 49.2 | 49.2 | 49.2 | 54.4 |

TABLE 1-continued

|  | | | | | | |
|---|---|---|---|---|---|---|
| C, % | 90.4 | 89.4 | 89.4 | 89.4 | 89.4 | 89.8 |
| H, % | 6.6 | 6.5 | 6.5 | 6.5 | 6.5 | 6.4 |
| N, ppm | 11300 | 12700 | 12700 | 12700 | 12700 | 11000 |
| S, ppm | 3400 | 4700 | 4700 | 4700 | 4700 | 3100 |
| 300-450° C. fraction | | | | | | |
| H, % | 7.2 | 7.2 | 7.2 | 7.2 | 7.2 | 7.2 |
| $H_{AR}$ % | 3.5 | 3.5 | 3.5 | 3.5 | 3.5 | 3.5 |
| Saturates, % | 3.8 | 4.0 | 4.0 | 4.0 | 4.0 | 4.1 |
| Total liquid product | | | | | | |
| C5-250° C. | 18.2 | 20.6 | 21.8 | 18.4 | 18.9 | 18.1 |
| 250-300° C. | 19.3 | 16.5 | 18.2 | 16.4 | 15.9 | 18.4 |
| 300-350° C. | 21.6 | 19.3 | 19.5 | 19.6 | 19.9 | 21.0 |
| 350-400° C. | 20.0 | 19.4 | 19.2 | 19.6 | 20.5 | 19.3 |
| 400-450° C. | 5.0 | 7.2 | 6.6 | 7.7 | 7.4 | 4.8 |
| 450° C.+ | 16.4 | 17.5 | 14.7 | 18.3 | 17.4 | 18.4 |
| C, % | 90.4 | 90.0 | 89.9 | 90.0 | 90.7 | 89.8 |
| H, % | 9.8 | 9.5 | 9.9 | 9.8 | 9.4 | 9.7 |
| N, ppm | 820 | 1030 | 770 | 1790 | 2050 | 1210 |
| S, ppm | 25 | 430 | 38 | 10 | 90 | 90 |
| Conversion of 450° C.+ % | 68 | 64 | 70 | 63 | 65 | 66 |
| 300-450° C. fraction | | | | | | |
| H, % | 9.2 | 9.2 | 9.3 | 9.4 | 9.2 | 9.2 |
| Change in H % | 2.0 | 2.0 | 2.1 | 2.2 | 2.0 | 2.0 |
| $H_{AR}$, % | 2.2 | 2.1 | 2.1 | 2.0 | 2.2 | 2.1 |
| Change in $H_{AR}$ | 1.3 | 1.4 | 1.4 | 1.5 | 1.3 | 1.4 |
| Saturates, % | 10.1 | 10.0 | 10.9 | 10.3 | 9.0 | 12.0 |
| Change in saturates, % | 6.3 | 6.2 | 6.9 | 6.3 | 5.0 | 7.9 |

| | Catalyst Code No. | | | | | |
|---|---|---|---|---|---|---|
| | LH19 | LH22 | LH28 | LH23 | LH25 | LH26 |
| Feed analysis, % | | | | | | |
| C5-250° C. | 0 | 0 | 0.2 | 0 | 0 | 0 |
| 250-300° C. | 0.6 | 1.4 | 1.6 | 1.4 | 1.5 | 1.5 |
| 300-350° C. | 15.2 | 18.0 | 19.4 | 18.0 | 17.4 | 19.3 |
| 350-400° C. | 21.2 | 19.3 | 21.4 | 19.3 | 20.4 | 21.1 |
| 400-450° C. | 11.4 | 9.3 | 7.1 | 9.3 | 6.3 | 7.4 |
| 450° C.+ | 51.6 | 52.0 | 50.3 | 52.0 | 54.4 | 50.7 |
| C, % | 90.2 | 89.3 | 90.3 | 89.3 | 89.8 | 90.4 |
| H, % | 6.3 | 6.5 | 6.5 | 6.5 | 6.4 | 6.6 |
| N, ppm | 12000 | 11500 | 11300 | 11500 | 11000 | 11300 |
| S, ppm | 3800 | 3800 | 3800 | 3800 | 3100 | 3400 |
| 300-450° C. fraction | | | | | | |
| H, % | 7.0 | 7.1 | 7.1 | 7.1 | 7.2 | 7.2 |
| $H_{AR}$ % | 3.6 | 3.5 | 3.5 | 3.5 | 3.5 | 3.5 |
| Saturates, % | 3.1 | 4.1 | 3.9 | 4.1 | 4.1 | 3.8 |
| Total liquid product | | | | | | |
| C5-250° C. | 8.4 | 17.9 | 14.8 | 11.3 | 18.3 | 17.5 |
| 250-300° C. | 5.9 | 13.1 | 15.4 | 11.4 | 19.3 | 17.3 |
| 300-350° C. | 24.0 | 22.5 | 23.8 | 21.8 | 21.0 | 22.2 |
| 350-400° C. | 27.0 | 18.8 | 19.8 | 21.1 | 19.2 | 19.9 |
| 400-450° C. | 10.6 | 5.1 | 5.5 | 5.2 | 4.8 | 5.1 |
| 450° C.+ | 24.1 | 22.6 | 20.7 | 29.4 | 17.4 | 18.0 |
| C, % | 89.2 | 91.0 | 91.3 | 90.9 | 90.2 | 91.4 |
| H, % | 8.1 | 8.8 | 9.0 | 8.4 | 10.0 | 9.5 |
| N, ppm | 4470 | 2700 | 1860 | 3250 | 960 | 1540 |
| S, ppm | 980 | 500 | 320 | 550 | 40 | 56 |
| Conversion of 450° C.+ % | 53 | 57 | 59 | 43 | 68 | 64 |
| 300-450° C. fraction | | | | | | |
| H, % | 8.4 | 8.5 | 8.7 | 8.4 | 9.4 | 9.0 |
| Change in H % | 1.4 | 1.4 | 1.6 | 1.3 | 2.2 | 1.8 |
| $H_{AR}$, % | 2.8 | 2.7 | 2.5 | 2.8 | 2.0 | 2.3 |
| Change in $H_{AR}$ | 0.8 | 0.8 | 1.0 | 0.7 | 1.5 | 1.2 |
| Saturates, % | 5.8 | 6.7 | 6.8 | 5.7 | 13.2 | 8.4 |
| Change in saturates, % | 2.7 | 2.6 | 2.9 | 1.6 | 9.1 | 4.6 |

I claim:

1. A coal liquefaction process in an ebullating bed reactor, comprising extracting a coal with a liquid hydrogen donor solvent at elevated temperature and pressure, catalytically hydrocracking at least a portion of the extract and partially hydrogenating the solvent at the same time and in the same reactor by employing a hydrocracking/hydrogenation catalyst, and recycling as solvent a fraction of the reactor product, using as the hydrocracking/hydrogenation catalyst a mixture comprising from 5 to 20% by volume of a first component which is composed of tungsten or molybdenum sulphide in combination with a nickel or cobalt, said first component being on a support, said nickel or cobalt promoting said first component's activity and a second component which consists of tungsten or molybdenum sulphide on a support, said second component being present in an amount of from 95% to 80% by volume based on the total volume of the catalyst mixture, whereby there are obtained increased product yields combined with reduced formation of naphthenes, said reduced formation of naphthenes being dependent on the volume ratio of the components in the catalyst mixture which is adjusted to give a specified ratio of hydrocracking the coal extract to hydrogenation of the solvent.

2. The process as claimed in claim 1, wherein said second component is air dried.

3. The process as claimed in claim 1, wherein each of the first and second components of said catalyst mixture comprises molybdenum.

4. The process as claimed in claim 1 wherein said activity promoting metal is nickel.

5. The process as claimed in claim 1 wherein said activity promoting metal is cobalt.

6. The process as claimed in claim 1 wherein said second component is vacuum dried.

* * * * *

UNITED STATES PATENT AND TRADEMARK OFFICE
CERTIFICATE OF CORRECTION

PATENT NO. : 5,110,451
DATED : May 5, 1992
INVENTOR(S) : Michael Andrew JONES

It is certified that error appears in the above-identified patent and that said Letters Patent is hereby corrected as shown below:

On the title page, item (30):
the Foreign Application Priority Data should read:

Aug. 22, 1986 -- [GB] Great Britain..............8620460 --

Signed and Sealed this

Seventeenth Day of August, 1993

Attest:

BRUCE LEHMAN

Attesting Officer    Commissioner of Patents and Trademarks